Sept. 1, 1959  F. J. MARGIDA  2,902,043
DISPLACEMENT TYPE BRAKE SAFETY VALVE
Filed Jan. 9, 1957
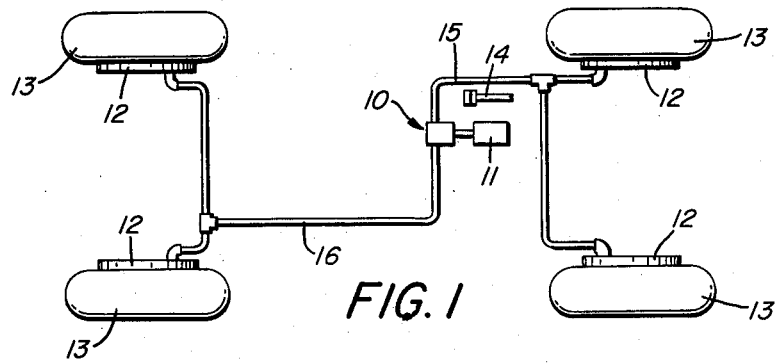
FIG. 1
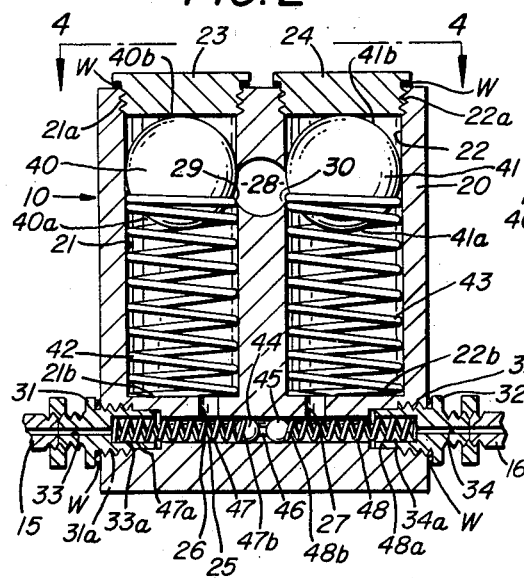
FIG. 2
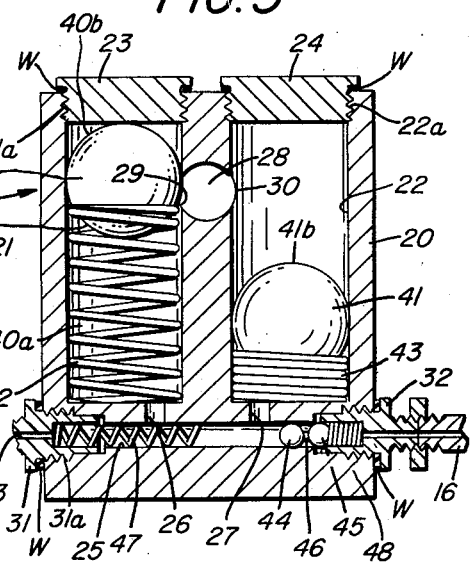
FIG. 3
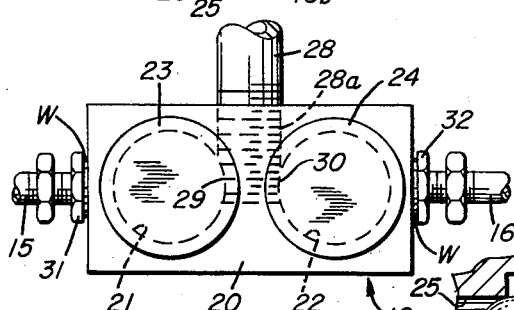
FIG. 4
FIG. 5
FIG. 6
INVENTOR.
FRANK J. MARGIDA
BY
ATTORNEY United States Patent Office 2,902,043
Patented Sept. 1, 1959

2,902,043

DISPLACEMENT TYPE BRAKE SAFETY VALVE

Frank J. Margida, Akron, Ohio, assignor to Saf-T-Brake Valve Company, Inc., Akron, Ohio, a corporation of Ohio Application January 9, 1957, Serial No. 633,245

6 Claims. (Cl. 137—118)

This invention relates to hydraulic brake control systems and in particular has reference to an improved type of safety mechanism for use in hydraulic brake systems of automobiles.

In co-pending application, Serial No. 477,668, filed by Frank J. Margida on December 27, 1954, and now United States Patent 2,854,016, issued September 30, 1958, there was disclosed an improved type of safety device that operated to eliminate a complete brake failure in the event one brake line was ruptured during usage thereof. In essence, the device of the above referred-to co-pending application employed a piston rod that was operable upon an abrupt decrease in pressure in one brake line, for example, to seal off the ruptured line with the result that further flow of braking fluid therethrough was obviated.

While the above type brake safety device has operated satisfactorily in the great majority of cases, it has been found that certain difficulties will be encountered in the use of the same in "unbalanced" brake systems where a great amount of fluid pressure is applied to the front brakes, for example, than is applied to the rear brakes of an automobile. It has been specifically found in this regard that the device of the aforementioned co-pending application would have to be modified so that the one pressure responsive end thereof was larger than the other in order that the proper balancing of the safety device would occur.

It has been found that if the hydraulic fluid entering the safety device is diverted into two separate and independent systems, that improved results will occur. In this regard, it has been found that if each system further includes an independently movable piston that operates against a relatively large fluid reservoir, that the device will operate on a displacement, rather than a pressure-responsive type of operation as has been set forth in the co-pending application.

It accordingly becomes the principal object of this invention to provide an improved type of safety device for hydraulic brake systems that is characterized by the adaptability of the same to use in "unbalanced" hydraulic fluid systems for braking an automobile.

It is a still further object of the invention to provide an improved type of safety device for hydraulic brake systems that features the use of two independent control points associated with the front and rear lines respectively of the braking system of an automobile.

It is a still further object of this invention to provide an improved type of safety valve for hydraulic brake systems that is efficient and safe in operation and is further characterized by the presence of a minimum number of component parts.

These and other objects of the invention will become more apparent upon a reading of the following brief specification considered and interpreted in the light of the accompanying drawings.

Of the drawings:

Figure 1 is a plan view illustrating schematically a hydraulic braking system for automobiles that is equipped with the improved safety device of this invention.

Figure 2 is a sectional view illustrating the position of the component parts of the safety device in the normal position of use.

Figure 3 is a view similar to Figure 2, but illustrating the position of the component parts when a failure has occurred in one brake line.

Figure 4 is a view taken along the lines 4—4 of Figure 2.

Figure 5 is an enlarged view of the displaced ball seated after failure.

Figure 6 is a partial cross-sectional view showing a modification of the invention.

Referring now to the drawings, and in particular to Figure 1 thereof, the improved safety device, generally designated by the numeral 10, is shown positioned in the brake system of an automobile so as to prevent the loss of braking fluid between the master cylinder 11 and a plurality of brake drums 12, 12 that are provided on the wheels 13, 13 and which connect with master cylinder 11 through front and rear brake lines 15 and 16 respectively, with the usual foot pedal 14 being employed to actuate the master cylinder 11.

As best shown in Figures 2 and 3 of the drawings, the safety device 10 includes a rectangular housing 20 that has a pair of cylindrical chambers 21 and 22 that are disposed on parallel axes and include internal threads 21a and 22a that receive screw plugs 23 and 24 that serve to seal off the axial ends of the chambers 21 and 22 adjacent one edge of the housing 20. The usual washers W, W may be employed to prevent leakage at this point of seal, while the opposed axial ends of the chambers 21 and 22 are shown connected to axial bore 25 by means of apertures 26 and 27.

To the end of introducing fluid to the housing, there is provided an inlet port 28, located on one surface of the housing 20 and positioned medially of the chambers 21 and 22, with this port internally threaded as at 28a, for interconnection with the master cylinder in known manner. Additional ports 29 and 30 are provided on the walls of the chambers 21 and 22 respectively, so as to interconnect with the inlet port 28 as best shown in Figure 4.

By like token, for the purpose of connecting with lines 15 and 16, the axial bore 25 is internally threaded at both axial ends thereof for reception therein of coupling fittings 31 and 32; the usual packing washers W, W being employed to prevent leakage between the just-described parts at their point of contact with each other. The fittings 31 and 32, in addition to including external threads 31a and 32a, are further defined by axial bores 33 and 34 that are counterbored as at 33a and 34a, with these component parts being concentric with the axial bore 25 to facilitate concentric positioning of lines 15 and 16 with bore 25 as shown.

To the end of making the above-described structure operative, for instance, at the time of a brake failure, volume displacement balls 40 and 41 are provided within the chambers 21 and 22 so as to be supported in the normal position of Figure 2 by compressible coil springs 42 and 43, with these springs 42 and 43 acting against the lower surfaces 40a and 41a of the balls 40 and 41 in opposition to the pressure exerted against the upper surfaces 40b and 41b, by the pressure in the lines. To preserve the balanced condition just described, the external diameter of the balls 40 and 41 is slightly less than the internal diameter of cylinders 21 and 22 so as to provide clearance for fluid flow during normal operation. Also, it is to be understood that under normal operating conditions, the balls 40 and 41 will move slightly axially of the chambers 21 and 22 responsive to ordinary braking action.

In addition to the primary displacement balls just described, there is also provided a pair of pressure-responsive balls 44 and 45 that are joined together as by a weld 46 and concentrically positioned within the axial bore 25 as is best shown in Figure 2. For the purpose of maintaining the balls 44 and 45 medially of bore 25, there are provided coil springs 47 and 48; the arrangement being such that the spring 47 has one end 47a thereof fitted into the counterbore 33a and has the opposed end 47b thereof seated against the ball 44, while the spring 48 has one end 48a thereof fitted into the counterbore 34a and has the opposed end 48b thereof seated against the ball 45. The external diameter of the balls 44 and 45 is shown to be substantially equal to the internal diameter of the bore 25 so as to minimize the flow of fluid therearound while permitting axial movement of the balls 44 and 45 upon the creation of a pressure differential as will be described.

In use or operation of the improved safety valve 10, the same is first installed in the hydraulic fluid line adjacent the master cylinder 11 as shown in Figure 1, so that the lines 15 and 16 are positioned with respect to the ports 33 and 34. In this condition the balls 40 and 41 are disposed at the upper end portion of the axial length of the cylinders 21 and 22 with the balls 44 and 45 being centered with respect to the axial bore 25.

During normal operation of the hydraulic braking system, the balls 40 and 41 will move axially of the chambers 21 and 22 but will never seat on the bottom of said chambers due to the back pressure exerted by the fluid in the lines.

However, when a failure occurs in the line 16, for example, it will immediately result in fluid being drained from this line through the ruptured area, and simultaneously with this draining of the fluid there will occur a pressure drop in line 16. As a result of this pressure drop, the pressure acting on the upper surface 41b of the ball 41 will be greater than the pressure acting in the ruptured line that is exerted against lower surface 41a thereof. This pressure differential will result in the ball 41 moving axially downwardly of the chamber 22 until the same seats against the closed end of chamber 22 at which time a minimal fluid flow will occur through aperture 27. Due to this minimal flow and the force of the fluid acting on ball 44, the ball 45, together with ball 44, will move rapidly to the right of Figure 3 with the ball 45 being snapped into seating engagement with the counterbore 34a to seal off the flow of fluid to the line 16 as shown in Figures 3 and 5.

Since the ball 41, in its axial movement to the bottom surface 22b merely displaces a predetermined volume of brake fluid, there will be no appreciable unbalance of pressure in the chamber 21, with the result that the line 15 will remain open to fluid flow, thus permitting normal braking action in the unruptured line of the hydraulic system.

It is to be noted that the component parts will hold the positions as illustrated in Figure 3 until the rupture in line 16 has been repaired, with spring 48 being insufficient in pressure to dislodge ball 45. Accordingly, to restore the system to normal after repair, it will be necessary to insert a ram or rod (not shown) into the bore 25 and apply outside force against the ball 45 to unsnap the same from its locked engagement with the counterbore 34a. Thereafter, the force of the extension of the spring 48 will return the balls 44 and 45 to the normal position of Figure 2 while the ball 41 will have assumed its normal position by virtue of the build-up of pressure against the lower surface 41a thereof operating in conjunction with the force occasioned by the expansion of the spring 43.

The safety device 10 is then again ready to guard against any subsequent failure.

It will be seen from the foregoing that there has been provided a new and novel safety device for use in minimizing the dangerous effects of a brake failure resulting from rupture of a hydraulic fluid line. The particular safety device has been illustrated in conjunction with the control of fluid in the lines 15 and 16 at their point of contact with the master cylinder 11. It is to be understood, however, that if desired, this invention may additionally be similarly employed to control the flow of fluid in other portions of the lines 15 and 16. It is to be further understood that the use of the paired pressure-responsive balls 44 and 45 is not a mandatory arrangement since a single ball, either circular or elliptical, as well as a small shaft having rounded axial ends could be used with equally good results. Similarly, the balls 40 and 41 may be replaced by discs or piston heads with the same equally good results. It also follows that if desired, the axes of chambers 21 and 22 could be made parallel to the axis of bore 25 to reduce the height and in such case, the balls 40 and 41 could be disposed for movement along parallel axes.

It has been shown how the construction of the safety device is of such a nature as to require a minimum number of parts, and further in this regard, that the parts are of such simplified structure that the same do not require any appreciable adjustment or maintenance care.

In Figure 6 there is shown a modification relating only to change in the means used to hold the balls 44 and 45 in normal position. Accordingly, where indicated, like numerals indicate like parts.

To this end, as is illustrated in Figure 6, the springs 47 and 48 are replaced by a centering ball 50 that is positioned between the balls 44 and 45 and maintained in position by the force exerted by a spring 51 that is received in bore 52.

The use and operation of this modified means is substantially the same as previously described with the balls 44 and 45 responding to pressure as before and overcoming the holding effect upon the creation of a pressure differential. As before, a ram or rod may be used to dislodge the ball 45 after repair of line 16.

While a preferred and modified form of the invention has been set forth in accordance with the dictates of the patent statutes, it is to be understood that the invention is not intended to be so limited. It accordingly follows from the above that other modifications of the invention may be resorted to without departing from the spirit hereof or the scope of the appended claims.

What is claimed is:

1. A safety device of the character described, comprising, a housing having an axial bore therethrough defining opposed outlet ports; a pair of elongate fluid reservoirs each having an axial length and each interconnected with said bore adjacent the axial ends thereof; an inlet port defined by said housing; conduit means interconnecting said inlet port with said fluid reservoirs; a pair of piston heads, each movable axially of one said reservoir and each having its peripheral edge spaced from the wall of each said reservoir with said piston heads restricting flow from said reservoir to said bore upon movement of the same towards the bore; a sealing plug, normally centered between said outlet ports in said bore; and means for shifting said sealing plug axially of said bore into sealing engagement with one said outlet port upon restriction of flow from said reservoir into said bore.

2. A safety device of the character described, comprising, a housing having an axial bore therethrough defining opposed outlet ports; a pair of elongate fluid reservoirs each having an axial length and each interconnected with said bore adjacent the axial ends thereof; an inlet port defined by said housing; conduit means interconnecting said inlet port with said fluid reservoirs; a pair of piston heads, each movable axially of one said reservoir and each having its peripheral edge spaced from the wall of each said reservoir with said piston heads restricting flow from said reservoir to said bore upon movement of the same towards the bore; a sealing plug, normally centered between said outlet ports in said bore; and means for shifting said sealing plug axially of said bore into sealing engagement with one said outlet port upon restriction of flow from said reservoir into said bore; said sealing plug being frictionally engaged by said outlet port upon axial shifting thereof.

3. The device of claim 1 further characterized by the fact that said sealing plug is normally centered by opposed springs each seated at one end thereof, adjacent one said outlet port.

4. The device of claim 1, further characterized by the presence of means for normally urging said piston members away from said bore under tension.

5. The device of claim 1 further characterized by the fact that said piston members are spherical in shape.

6. The device of claim 1 further characterized by the fact that said reservoirs are communicable with said bore when said plug is in sealing relationship with one said outlet port.

References Cited in the file of this patent
UNITED STATES PATENTS

| | | |
|---|---|---|
| 2,231,942 | O'Dowd | Feb. 18, 1941 |
| 2,386,585 | Blank | Oct. 9, 1945 |
| 2,854,016 | Margida | Sept. 30, 1958 |